Patented June 29, 1926.

1,590,661

UNITED STATES PATENT OFFICE.

ALOIS ZINKE, OF GRATZ, AUSTRIA, ASSIGNOR TO FELICE BENSA, OF GENOVA, ITALY.

PROCESS FOR MANUFACTURING PERYLENE COMPOUNDS OF QUINONE CHARACTER.

No Drawing. Application filed April 7, 1925, Serial No. 21,324, and in Austria April 10, 1924.

It has been discovered that perylene chlorides obtained by processes which do not form part of the present invention are oxidized by hot concentrated sulphuric acid. By precipitating with water perylene compounds of quinone character are obtained from the product of reaction which are useful as starting materials for the manufacture of other perylene compounds.

The following is a description of an example of carrying into practice the present process:

Five parts by weight of perylene dibromide of the melting temperature of 278° centigrade are introduced into 20 parts by weight of concentrated sulphuric acid and slowly heated. At 30 to 40° centigrade perfect solution with a reddish violet colour takes place, at 95 to 100° centigrade bromine and hydrobromic acid escape and the colour of the solution turns into blue. The temperature is raised from 130 to 140° centigrade and this temperature is maintained at this degree for about one hour. The solution which is then of a violet colour is poured into water whereby the product of the reaction is precipitated in violet flakes. For purifying the product is washed with water and then crystallized from boiling glacial acetic acid whereby the same is obtained in dark violet needles. The product is insoluble in most of the usual solvents. The vat is red with an intense green fluorescence. By treating perylene dibromide of the melting temperature of 189° centigrade under the same conditions, a brown substance is obtained as the product of reaction which furnishes a red vat. By repeatedly preparing a vat of the product and reoxidizing it and subsequent crystallizations from benzol, yellow needles are obtained which are found to be identical with perylene 3.10 quinone, described in Monatshefte für Chemie vol. 40 page 407.

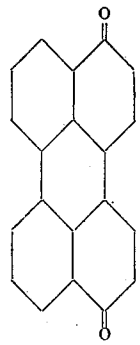

The other halogen compounds of perylene react similarly.

What is claimed is:

Process of manufacturing perylene compounds of quinone character consisting in treating halogen compounds of perylene with concentrated sulphuric acid at a temperature of from 130 to 140° centigrade.

In testimony whereof I have affixed my signature.

ALOIS ZINKE.